April 23, 1929.  V. BACH  1,710,397
SLAB SCOOP FOR ICE CREAM
Filed June 13, 1927
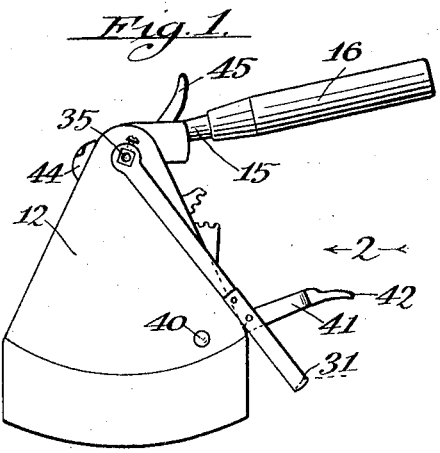
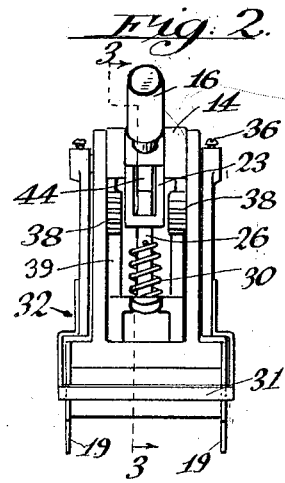
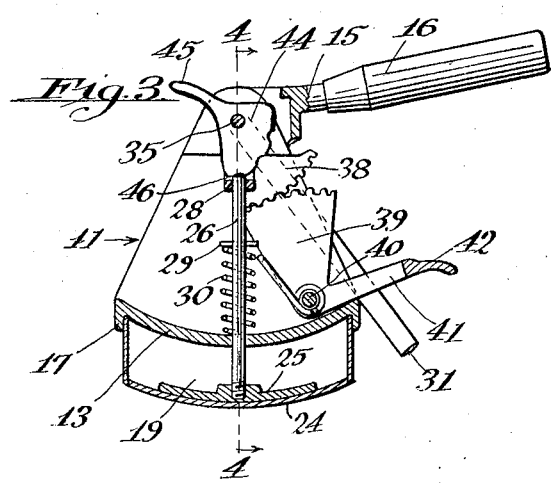
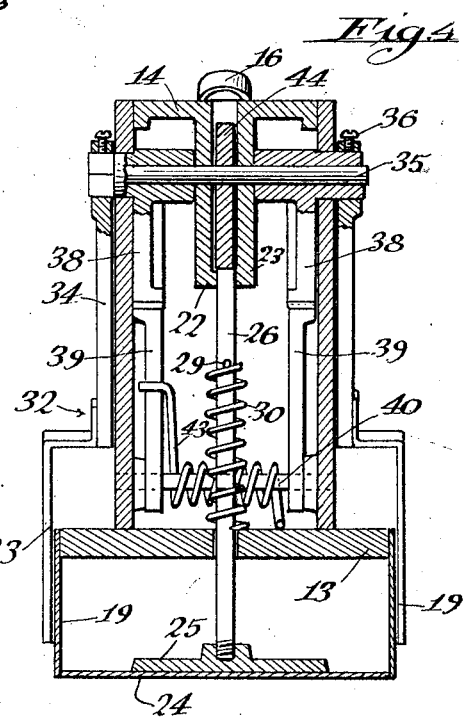
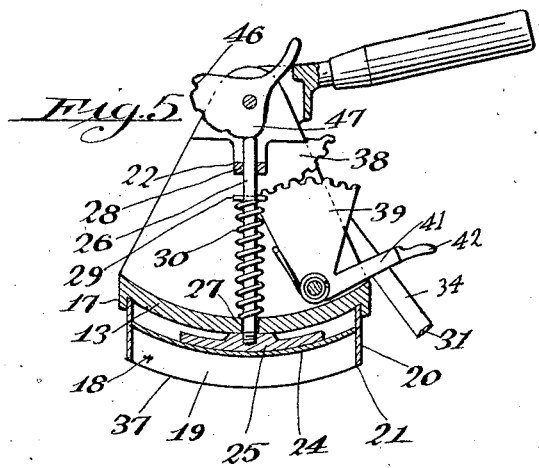
Inventor
Valentin Bach
by Hazard and Miller
Attorneys Patented Apr. 23, 1929.

1,710,397

UNITED STATES PATENT OFFICE.

VALENTIN BACH, OF MANHATTAN BEACH, CALIFORNIA.

SLAB SCOOP FOR ICE CREAM.

Application filed June 13, 1927. Serial No. 198,508.

My invention is a slab scoop for ice cream to dispense ice cream in the form of thin slabs.

An object of my invention is a scoop for dispensing ice cream, in which the ice cream is cut or scooped from a can or the like having ice cream in bulk, in the form of a slab. In the prior practice for forming slabs of ice cream, such as are used in connection with making ice cream sandwiches between wafers of pastry or the like, it has been the custom to cut the slabs from bricks of ice cream or the like. This necessitates the person dispensing such ice cream sandwiches to have a stock of ice cream bricks which are more expensive and are less readily handled than ice cream in bulk in a can which may be maintained continuously in a freezing temperature, such cans being only opened when it is necessary to dispense the ice cream.

Therefore, with the implement of my invention I may insert this through the open top of an ice cream can and sever a certain amount of the ice cream in the form of a slab, which may be placed between a pastry and form an ice cream sandwich, or may be sold in the form of a slab on a serving dish or the like.

Another object of my invention is the construction of a scoop which may be used to dispense different kinds of ice cream in thin layers, or formed into one slab. For instance, with my scoop I may take a thin layer of vanilla ice cream from one can, a second thin layer, say of strawberry from another can, and if desired, another layer, say of chocolate, from another can, these being formed into one integral slab having three different layers.

Another object of my invention is the construction of a scoop which may be readily manipulated by one hand to sever the ice cream from the can in bulk, and remove same from the can and by manipulation of a finger, the slab may be expelled on a wafer or a serving dish.

In constructing my invention I have a suitable frame-work with an open ended receptacle extending below the base, this receptacle having sharp edges, and if desired, it may be formed rectangular or any other shape. A knife is manipulated by the fingers to cut through the ice cream below the lower cutting edges of the receptacle and thus sever the ice cream in the receptacle from the main bulk in the can. In order to deposit the slab on the wafer or serving dish, a cam may be manipulated by the thumb and pressed downwardly on a plunger, this plunger thrusting a false base outwardly of the receptacle, expelling the slab.

My invention may be more readily understood from the following description and drawings, in which: Figure 1 is a side elevation of my scoop.

Figure 2 is an end elevation taken in the direction of the arrow 2 of Fig. 1.

Figure 3 is a vertical longitudinal section on the line 3—3 of Fig. 2 in the direction of the arrows, with the parts in position for expelling the slab of ice cream.

Figure 4 is a vertical transverse section on the line 4—4 of Fig. 3 in the direction of the arrows, shown on an enlarged scale.

Figure 5 is a view similar to Fig. 3 with the scoop in position for cutting the slab of ice cream.

The main stationary parts of my scoop comprise a suitable frame 11 which has arcuate side walls 12, arcuate base 13 and a rigid cap 14 secured to the upper ends of the sides. Extending laterally from the cap there is a fixed bar 15 on which a handle 16 is secured. Depending from the base there are ribs 17 and below such ribs there is formed a slab-receiving receptacle 18, this having arcuate side walls 19 and end walls 20. These walls are formed comparatively thin and may, if desired, have the lower edge sharpened, as indicated at 21. A bridge 22 is suspended by means of straps 23 from the cap 14. A false base 24 is formed of preferably a thin plate bent on a curve, and to this is secured a backing lug 25. To this lug there is secured a stem 26 which passes upwardly through an opening 27 in the base 13 and extends through a guide opening 28 in the bridge 22. A pin or collar 29 is secured to this stem and there is a compression spring 30 between such pin and the upper surface of the base 13, this spring normally tending to raise the false base into the position shown in Fig. 5.

When it is desired to scoop a slab from bulk ice cream in a can, the scoop is pressed into the bulk ice cream so that the sides 19 and 20 of the receptacle 18 are forced into such bulk material, that is, until the downward movement of the scoop is prevented by the false base 24.

The cutting mechanism for severing the slab from the bulk is substantially as follows:

A knife 31 is mounted on a pair of arms 32 which arms are shown at their lower part 33 as extending around the sides 19 of the receptacle, and have an upper extension 34 preferably passing on the outside of the side walls 12. The upper ends are secured to a rock shaft 35 by set screws 36 or the like so that on rocking this shaft, the knife is swung from the position shown in Figs. 1, 3 and 5 to the opposite side of the receptacle. As the knife describes an arc having the shaft 35 as a center, the lower edge 37 of the sides 19 of the receptacle are curved, using the shaft as a center. The curvature of the false base 24 is also concentric to the lower edge of the receptacle so that the slab will be of equal thickness in all parts.

A pair of upper segmentary gears 38 are keyed or otherwise secured on the shaft 35 and a pair of lower segmentary gears 39 are mounted on a shaft 40 which extends between the side walls 12, and formed integrally with one of these latter gears there is an operating arm 41 having a finger grip 42. A coiled spring 43 is wound on the fixed shaft 40 and interengages between the base 13 and either one or both of the segmentary gears 39, this spring being tensioned to normally hold said gears in the position shown in Figs. 1, 3 and 5. When the receptacle is properly embedded in the bulk ice cream with the operator holding the device by the handle in the hand, the finger grip 42 is preferably engaged by the first finger and pulled upwardly, thus rocking the lower gear 39 and transmitting the motion to the upper segmentary gear 38 which rocks the rock-shaft 35 and hence swings the knife through the instrumentality of the arms 32 from the position shown in Figs. 1, 3 and 5 to the opposite side of the receptacle. This severs part of the ice cream from the bulk.

The means for expelling the slab comprise a cam 44 which is loosely mounted on the rock shaft 35 and has a thumb engaging end 45. This cam in the position for filling the receptacle is in the position shown in Fig. 5. To expel the ice cream it is merely necessary to thrust with the thumb on the end 45, thus shifting the cam from the position shown in Fig. 5 to that in Fig. 3, this action depressing the stem 26 and moving the false base 24 from the position shown in Fig. 5 to that of Fig. 3 whereby the slab may be deposited on a wafer or a serving dish.

The manner of securing a slab having different distinct layers is accomplished by having a series of notches 46 on the cam, thus the notch nearest the lower end of the cam 47 may engage the upper part of the stem 26 which raises the false base slightly above the lower edge 37 of the receptacle and the receptacle may be filled to this extent with one type of ice cream and the knife manipulated to sever this thin layer. The thumb grip 45 may then be moved upwardly until another notch engages the upper part of the stem 26 and another flavor or color may be severed from another can, this being cut by the knife as above described. It is obvious that I may provide as many of these notches as I desire so that more than two distinct layers of ice cream may be cut from the bulk from different cans, before the false base is in its complete upper position, as shown in Fig. 5 with the upper part 47 of the cam engaging the upper part of the stem. When such composite slab is expelled from the receptacle in the manner above described, it provides a slab having these distinct layers giving different flavors and a pleasing appearance.

In manipulating my scoop it is desirable that it be maintained rather cold, and to this end it is desirable to stand it in a body of cold water so that the receptacle is covered by the water, or else to place the whole instrument inside of a freezer. However, the slight melting of the ice cream in using the implement is advantageous as it prevents sticking of the ice cream to the receptacle or to the false base 24. It also allows ready cutting by the knife 31. It is obvious that the shape and design of my scoop may be materially changed and provide for cutting round slabs or those of any other fancy shape which may be desired. It is also obvious that the scoop may be utilized for severing other types of product other than ice cream, but the latter is the immediate use to which I am placing my invention.

Various changes may be made in the principles of my invention without departing from the spirit thereof, as set forth in the description, drawings and claims.

I claim:

1. A scoop for a food product comprising in combination a frame having an arcuate base, walls depending therefrom forming an open bottomed receptacle, the side walls having their lower edges concentric to the base, a rock shaft mounted in the frame at the axial center of the arcuate base, a knife connected by arms to said rock shaft, a segmental gear keyed to said shaft, a shaft having a second segmental gear, said gears meshing, a finger grip connected to said second gear, a handle connected to said frame whereby the receptacle may be forced into a bulk product, the product entering through the open base and the finger grip operated to swing the knife across the open bottom and sever the product in the receptacle from the bulk.

2. A scoop, as claimed in claim 1, a false base concentric to the base, a stem connected thereto and slidable in the frame, a cam loosely mounted on the rock shaft, said cam engaging the stem and having a thumb grip, the thumb grip being adjacent to the handle, actuation of the thumb grip and cam expelling the severed product through the open bottom of the receptacle.

3. A scoop, as claimed in claim 1, a false base in the receptacle having a curvature concentric with the base, a stem connected thereto and extending through the base and a guideway in the frame, a spring engaging the stem tensioned to draw the false base upwardly in the receptacle, a pivotally mounted cam having a series of notches, said notches allowing step by step inward movement of the false base, and means to operate said cam to expel a severed product.

4. A scoop for food products comprising in combination a base having depending walls forming an open-bottomed receptacle, the lower edges of the side walls being arcuate, a cross shaft mounted in the frame concentric with the arcuate edges of the walls, a false bottom having a curvature concentric with the said lower edges, a knife mounted on the shaft to swing across the lower edges of the said walls, a segmental gear mounted on the shaft, a second shaft mounted transversely of the frame and having a segmental gear thereon with a finger grip, the said gears meshing, the operation of the gears swinging the knife, and means to depress the false bottom to expel a slab of the food product.

5. A scoop, as claimed in claim 4, the false bottom having a stem extending upwardly through the base and slidable in the frame, a cam pivotally mounted in the frame and having a series of notches to engage the said stem, and means to actuate the said cam, the cam and the notches allowing an inward step by step motion to form slabs of a plurality of different ingredients.

6. A scoop for food products comprising in combination a frame having side walls, an arcuate base secured to said walls, depending walls secured to the base, the said side walls having arcuate lower edges and forming an open receptacle, a transverse shaft mounted in the upper part of the said frame, said shaft being at the axial center of the arcuate base and walls, a pair of segmental gears mounted on the shaft, a second shaft having a pair of segmental gears mounted thereon meshing with the first gears, a finger grip for the second gears, a handle secured to the frame, a knife having side arms, said arms being connected to the first shaft, the knife being adapted to follow the contour of the open receptacle on actuation of the second segmental gears by the finger grip, spring means to return said gears to the normal position, and means to expel a food product from the receptacle.

7. A scoop, as claimed in claim 6, means to expel the food product from the receptacle comprising an arcuate false base concentric to the first mentioned shaft, a stem extending upwardly through the base, a cam pivotally mounted in the frame and having a plurality of notches engaging the stem, a spring on the stem forcing the upper end into engagement with the cam, the cam and notches providing means for a step by step inward movement of the false base and the said cam having means to operate same to force the false base to its outermost position.

8. In a scoop for food products, an open-bottomed receptacle to receive bulk food products, a false base mounted therein, a cam having a series of notches, means interconnecting the cam and the false base to allow inward movement of the false base step by step to fill the receptacle with different ingredients, and means to actuate the cam to expel the product from the receptacle.

9. In a scoop for food products, a frame having an open-bottomed receptacle, a false base slidably mounted therein, a stem connected to said base, a pivotally mounted cam having a series of notches, said notches engaging the stem, means to actuate the cam, the notches allowing step by step inward movement of the false base to fill the receptacle with different ingredients, the cam in the opposite movement pressing the stem and operating the false base to expel said ingredients.

10. A scoop for food products comprising in combination a frame having an arcuate base, walls depending from the base forming an open bottomed receptacle, the side walls having their lower edges arcuate concentric with the base, a false base in the receptacle concentric to the base, a stem connected to the false base and slidable in said frame, means connected to the frame to force the receptacle into a bulk product, such product entering through the open bottom, means to sever the product in the receptacle from the bulk, a cam pivotally mounted in the frame and engaging said stem to force the false base downwardly to expel the severed product, the cam having a series of notches, and a spring operating on the stem normally forcing the stem and false base upwardly, said cam with the notches giving a step by step upward movement of the false base to allow the severing of different layers of a food product in the receptacle.

11. A scoop for food products comprising in combination a frame having an arcuate base with depending walls forming an open-bottomed receptacle, a shaft in said frame, the base being concentric to the shaft and the lower edges of the depending walls being concentric to the base, a false bottom having a curvature concentric with the base, a knife mounted on the said shaft to swing across the lower edges of the said walls, means to insert the receptacle into a bulk food product, means to actuate the knife, means to depress the false bottom to expel a severed bulk product, the means to expel the bulk product comprising a stem connected to the false bottom, and a cam pivotally mounted in the frame and having a series of notches, the said cam in one movement allowing the step by step upward movement of the false bottom and in another movement depressing the false bottom.

In testimony whereof I have signed my name to this specification.

VALENTIN BACH.